Oct. 3, 1967   M. KOCHMAN   3,344,735
COMBINATION GRIDDLE AND HOT PLATE
Filed Sept. 28, 1966   2 Sheets-Sheet 1

INVENTOR
M. KOCHMAN
BY Burgess, Dinklage & Sprung
ATTORNEYS

Oct. 3, 1967   M. KOCHMAN   3,344,735
COMBINATION GRIDDLE AND HOT PLATE
Filed Sept. 28, 1966   2 Sheets-Sheet 2

INVENTOR
M. KOCHMAN
BY Burgess, Dinklage & Sprung
ATTORNEYS

# United States Patent Office 3,344,735
Patented Oct. 3, 1967

3,344,735
COMBINATION GRIDDLE AND HOT PLATE
Miroslav Kochman, 34–43 Crescent St.,
Long Island City, N.Y. 11106
Filed Sept. 28, 1966, Ser. No. 582,636
8 Claims. (Cl. 99—340)

ABSTRACT OF THE DISCLOSURE

This specification is directed to a griddle-hot plate adapted to be used with either flat surface thereof facing a heat source and the opposite surface thereof providing direct or indirect cooking surface. The hot plate of this invention has one substantially flat surface, preferably having a circumferential groove therearound, and an opposite surface which is substantially flat, at least one continuous rib wall substantially centrally disposed; and a multiplicity of legs extending from said surface to a height greater than the rib wall. In operation, where the surface of the hot plate described having rib walls thereon is directed toward a heat source, the centrally disposed rib wall is adapted to be inserted into a center opening of a gas burner and the legs are adapted to insert through grid arms which are usually found in either gas or electrical ranges.

This invention relates in general to the art of cooking utensils, and more particularly to a combination griddle and hot plate.

The combination griddle and hot plate of the invention can be considered basically as the combination of a plate member and a plurality of leg members projecting outwardly from one side surface thereof. One side surface of the plate member serves as a griddle surface and the opposite side surface, the one with the projecting leg members, serves as a hot plate surface.

For use as a griddle, the plate member is placed upon the stove, such as a conventional gas burner in a generally horizontal attitude wherein the griddle surface faces upwardly and the hot plate surface faces downwardly to receive heat from the stove.

For use as a hot plate in heating food contained in a vessel such as a pot, pan, or even a plate, the plate member is placed upon the stove in an inverted attitude, also generally horizontal, such that the griddle surface faces downwardly to receive heat from the stove and the hot plate surface faces upwardly to transfer the heat thus received to the vessel substantially by radiation and convection, with the vessel being supported in overlying spaced-apart relation to the hot plate surface and resting upon the ends of the leg members. In the hot plate mode of operation, relatively little heat is transferred to the vessel by conduction through the leg members, which for such purpose, are constructed with relatively small transverse cross-section dimensions as compared to the total hot plate surface area. Thus, the transfer to the vessel is primarily by radiation and convection, and is therefore indirect heating rather than direct heating as in the case of the griddle mode of operation.

Consequently, in the hot plate mode of operation, the temperature induced in the vessel will be substantially less than those which would result where such vessel is placed upon the griddle surface as in the case of griddle mode operation. In general, the vessel temperatures attained in hot plate heating, for a given hot plate surface temperature, will be dependent upon the length of the leg members, since leg member length establishes the vessel-to-hot plate surface spacing. For typical applications of the invention, the leg members are constructed with a length of approximately ½ inch which has been found to maintain food held in various types of vessels at a temperature sufficiently high as to be palatable, but not so high as to dry it excessively.

The combination griddle and hot plate according to a preferred embodiment of the invention is constructed for use in conjunction with conventional household gas burners. These burners individually are provided with a grid, usually cast iron, and of generally open construction to serve for supporting cooking utensils over the burner jets. Ordinarily, such burner grids have a plurality of arm members which extend horizontally and inwardly in a symmetrically spaced arrangement toward the center of the burner, and define a central opening thereabout which is generally centered in relation to the flame jet pattern.

When the plate member is to be used as a griddle, on such a gas burner, the hot convective flame gases rise, impinge against the hot plate surface, and tend to flow outwardly therealong until they escape at the peripheral boundary of the hot plate surface. It has been found that by providing a rib wall which projects outwardly from the hot plate surface, a more uniform temperature heating on the griddle surface can be obtained since such rib wall acts as a barrier to retard the outward flow of flame gases. The achievement of uniform griddle surface temperature conditions can be further aided by providing an additional rib wall at the peripheral boundary of the hot plate surface. This second rib wall projects outwardly from the hot plate surface at the peripheral boundary thereof to define a barrier which serves to retard the escape of hot flame gases at the boundary and thereby aids in furthering the effect of the first rib wall barrier which is located approximately midway between the center of the hot plate surface and the peripheral boundary thereof, and which laterally surrounds a central portion of the hot plate surface.

To aid in centering the plate member on a burner grid, a third rib wall annular in configuration and geometrically centered with respect to the hot plate surface is provided. This annular rib wall projects outwardly from the hot plate surface and is of an external diameter and height which enables it to be inserted into the central opening provided on the burner grid. Such third rib wall is greater in height than either of the other two rib walls, and is lesser in height than the leg members such that this annular rib wall, which is the innermost, projects beyond the other two rib walls to extend into the burner grid opening for engagement with the parts defining such opening and thereby limit the lateral shifting of the plate member with respect to the burner when the plate member is used as a griddle. Since the leg members project further than any of the rib walls, when the plate member is placed upon the burner in an inverted attitude for use as a hot plate, the vessel to be heated will be supported on the free ends of the leg members thereby minimizing the transmission of heat to such vessel by conduction through contact with any of the rib walls. While the rib wall which serves for centering and aligning the plate member can be made equal in height to the leg members, such an arrangement would increase the total heat conduction path area from the hot plate surface to the vessel, and hence in most practical applications would be undesirable.

The number and arrangement of the leg members is such as to provide a stable support for the vessel to be warmed, and such stability requires at least three leg members arranged in lateral spaced-apart relation to one another such that their free ends can contact the vessel at a minimum of three non-collinear points. For better stability, the number and arrangement of the leg members is such as to provide groups of three or more leg members located at radial distances from the plate member center commensurate with the size range of vessels to be supported.

The leg members are preferably arranged in a laterally spaced-apart relation to each other whereby each of the leg members can freely extend into the open portions of the grid on the burner used for heating, so that when the plate member is used as a griddle, it can rest upon the burner grid supported by one or both of its outer rib walls without any interference of leg members with grid parts.

It is therefore, an object of the invention to provide a combination griddle and hot plate which can be heated by a conventional stove, and used alternatively for either direct or indirect heat cooking.

Another object of the invention is to provide a combination griddle and hot plate as aforesaid which provides a uniform temperature distribution over the area of its griddle surface.

A further object of the invention is to provide a combination griddle and hot plate as aforesaid which utilizes heat supplied by a stove in an efficient manner.

Still another and further object of the invention is to provide a combination griddle and hot plate as aforesaid which is adapted for use with conventional gas burner stoves of the type having covering grids of open construction to support cooking utensils for heating by underlying flame jets.

Other and further objects and advantages of the invention will become apparent from the following detailed description and accompanying drawings in which.

Figure 1:
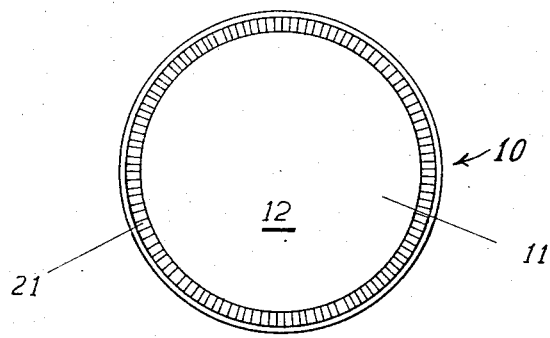
FIG. 1 is a plan view of a combination griddle and hot plate according to a preferred embodiment of the invention as seen looking toward its griddle surface side.
Figure 2:
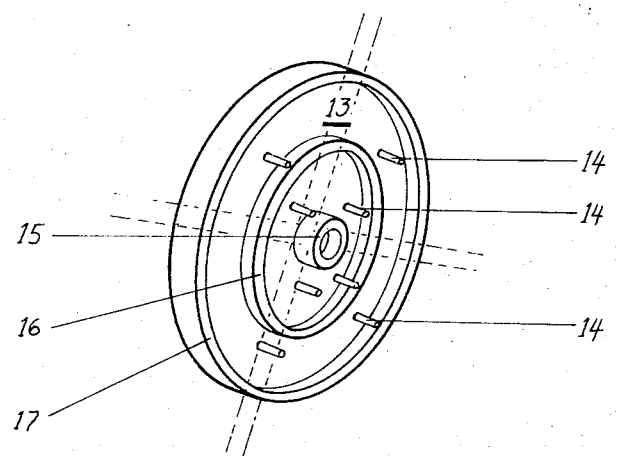
FIG. 2 is a perspective view of the combination griddle and hot plate of FIG. 1 as seen looking toward its hot plate surface side underlying the griddle surface side.
Figure 3:
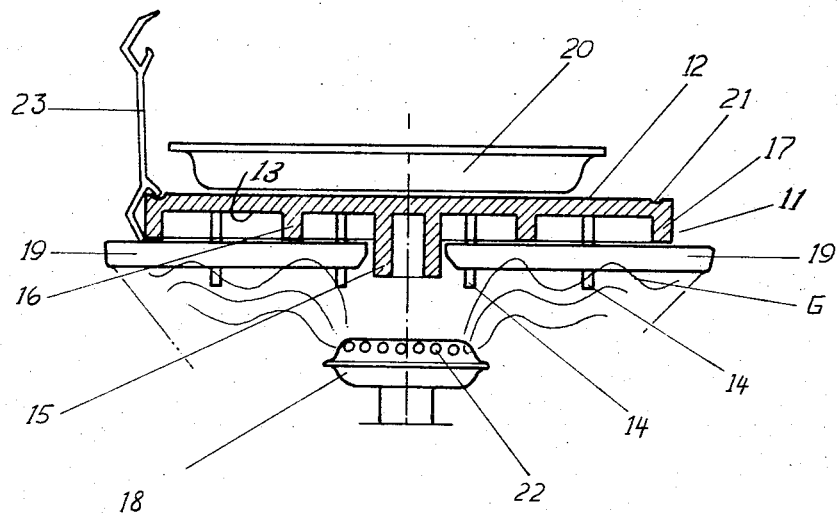
FIG. 3 is an elevation view, partly in section, of the combination griddle and hot plate of FIGS. 1 and 2 shown in conjunction with a typical gas stove burner and supported thereupon in an attitude for use as a griddle.
Figure 4:
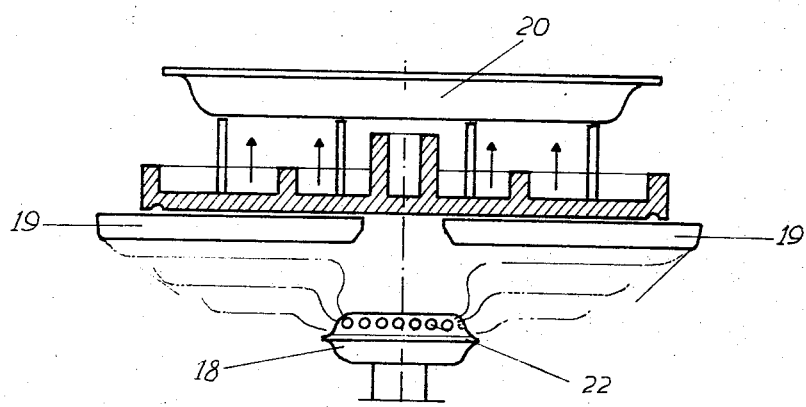
FIG. 4 is an elevation view, partly in section, of the combination griddle and hot plate of FIG. 3 shown as supported upon the gas stove burner in an attitude for use as a hot plate.

Referring now to FIGS. 1 and 2, the combination griddle and hot plate 10 of the invention is expediently of circular, plate-like construction for use in conjunction with the gas stove burners as illustrated in FIGS. 3 and 4. In general, the griddle and hot plate 10 comprises a plate member 11, preferably flat, and having one side surface which is used as a griddle surface 12, with the opposite side surface of plate member 11 being used as a hot plate surface 13. The hot plate surface 13 is provided with a plurality of rod-like leg members 14, an annular rib wall 15, an intermediate rib wall 16, and a peripheral rib wall 17, all of which project outwardly from the surface 13.

While the leg members 14, and rib walls 15, 16 and 17 can be fabricated as separate parts and secured to the surface 13 of plate member 11 by any conventional fastening means, such as welding, these elements 14–17 are expediently constructed integrally with the plate member 11 as by casting with a common material, preferably aluminum. In this way, the entire griddle and hot plate assembly 10 can be fabricated as a monolithic unit, and all of its parts can be of the same material, aluminum being the preferred choice because of its excellent heat conduction properties.

As exemplified by FIG. 3, the plate member 11 can be placed in a generally horizontal attitude upon a conventional gas burner 18, supported by the grid arms 19 thereof such that the surface 12 faces upwardly to accommodate the cooking thereon, and the hot plate surface 13 faces downwardly to receive heat from the burner 18. Foods may be cooked either directly upon the griddle surface 12, or in a pan 20 placed thereupon, and to catch and retain any melted fat or grease which might otherwise flow off surface 12, a groove 21 is preferably provided along the periphery of surface 12.

Apart from the groove 21, the surface 12 is flat and smooth to facilitate cleaning and so that, as exemplified in FIG. 4, the plate member 11 can be placed upon the burner 18 in an inverted horizontal attitude, with surface 12 facing downwardly and resting against the grid arms 19, as when the griddle and hot plate 10 is used as a hot plate to warm foods held in the pan 20. In such inverted attitude, the flame gases do not come in contact with the pan 20, but rather impinge upon the surface 12 to raise the temperature of the plate member 11 for transmitting heat from the upwardly facing surface 13 thereof to the pan 20, primarily by radiation and convection since the leg members 14 are relatively thin in cross section, and the total conductive path area presented by the leg members 14 is relatively small in comparison to the area of surface 13. The temperature to which the pan 20 and its contents are heated when supported upon the ends of the leg members 14 will be dependent upon the intensity of the burner 18 flame and the length of said leg members 14, which are expediently uniform in length and establish the spacing between the pan 20 and the hot plate surface 13. For a given flame intensity, the pan 20 temperature will decrease with increasing leg member 14 length, and vice versa. It has been found that a leg member 14 length of approximately ½ inch is generally satisfactory for use with ordinary household gas burners 18, and will allow the warming of foods held in glass, plastic, and even paper dishes (not shown) as well as foods held in metal vessels such as pan 20, without any hazard of dish breakage, melting or burning.

When the plate member 11 is used as a griddle, the intermediate rib wall 16 acts as a barrier to retard the upward flow along surface 13 of flame gases G, and the peripheral rib wall 17 similarly acts as a barrier to retard the escape of such gases at the peripheral boundary of surface 13 after they have passed over the rib wall 16. This retardation of hot gas flow allows a more efficient utilization of the heat supplied to plate member 11, and induces a substantially uniform temperature heating of the griddle surface 12, such that the positioning of food thereupon for cooking becomes non-critical. This is particularly true in the case of gas burners 18 which create an annular array of flame jets. For such burners 18, as represented in FIGS. 3 and 4, the flame gases G initially come in contact with surface 13 around a corresponding annular zone about the jet nozzles 22, and thence flow outwardly along surface 13 and radially with respect to the center of jet nozzle 22 pattern. With such a burner 18 construction, the plate member 11 is preferably circular in shape, and the rib walls 16 and 17 are annular and geometrically centered with respect to the plate member 11.

The innermost rib wall 15 is also annular, but primarily for a different purpose, namely to prevent the lateral shifting of plate member 11 when used as a griddle. This lateral restraint is achieved by making the rib wall 15 greater in height than either of the other rib walls 16 and 17, and with an external diameter which will enable said rib wall 15 to be inserted into the central opening defined by the grid arms 19, of which there are ordinarily four grid arms 19 disposed 90° apart from one another.

The rib walls 16 and 17 can be made equal in height so that the plate member 11 will be supported upon the grid arms 19 by both rib walls 16 and 17, or said rib walls 16 and 17 can be of unequal heights, in which case the plate member 11 will be supported on grid arms 19 by the rib wall 16 or 17 of greater height.

To avoid interference with the grid arms 19 such as would prevent the plate member 11 from being supported in a stable, centrally aligned position upon the grid arms 19 with rib wall 15 inserted into the opening defined by the inwardly pointing ends of these grid arms 19, the leg members 14 are arranged in a laterally spaced-apart relation to one another such that each leg member 14 is disposed for free extension into the open portions between the adjacent grid arms 19, as illustrated in phantom in FIG. 2.

While the dimensions of the plate member 11, rib walls 15–17, and arrangement of the leg members 14 can be varied to suit the geometry of various types of gas burners and associated grids, for a burner 18 which has nozzles 22 arranged to create a circular array of flame jets, the diameter of the intermediate rib wall 16 is preferably made greater than the diameter of the nozzle 22 pattern, so that the flame gases G will initially strike surface 13 within the annular zone bounded by the inside of rib wall 16 and the outside of rib wall 15.

The plate member 11 is expediently made of a diameter so as to be compatible with individual burners and thus will not interfere with cooking on adjacent burners of a multi-burner stove. Although individual stoves may have burners which use flame jet patterns other than annular, an intermediate rib wall 16 of diameter approximately ½ that of the plate member 11, as a general rule will be satisfactory since for most commercially produced gas burners, the flame gases will first strike surface 13 no further outward than ½ of the burner diameter.

For example, in a typical combination griddle and hot plate 10 construction, the plate member 11 can be approximately 8 inches in diameter and ¼ inch thick, exclusive of rib walls 15–17. Ribs walls 16 and 17 can be expediently ¼ inch in height, with rib wall 15 being slightly less, by about ¹⁄₁₆ to ¹⁄₃₂ inch, in height than the leg members 14 which are expediently of ½ inch height. It should be noted that the rib wall 15 is kept below the height of leg members 14 to minimize the heat conduction path area from surface 13 to the vessel to be warmed when plate member 11 is inverted for use as a hot plate. However, rib wall 15 and leg members 14 can be made the same in height if desired, in which case the rib wall 15 will also contact the bottom of pan 20. With such dimensions, a commonly attached handle (not shown) need not be provided for lifting and turning the combination griddle and hot plate 10, as such can be done simply by means of a common beer can opener 23 which has a cap lifting portion 24 that can reach into the groove 21 and over the peripheral rib wall 17.

To accommodate the supporting of various size pans 20 and dishes (not shown) upon the leg members 14, such leg members 14 are preferably arranged in two or more groups of at least three leg members each, with the leg members 14 of each group being arranged to support the pan or dish at a minimum of three non-collinear points as required for stability. The leg members 14 of each group are preferably arranged at a common radial distance from the center of plate member 11.

As can be appreciated by the artisan from the foregoing description of the invention in terms of a preferred embodiment, the invention is susceptible of numerous obvious modifications and variations. However, the invention is intended to be limited only by the following claims in which I have endeavored to claim all inherent novelty.

What is claimed is:

1. A combination griddle and hot plate which comprises a substantially flat plate adapted to be used in operable association with a source of heat, wherein one surface of said plate has extending therefrom a substantially centrally disposed continuous rib wall and a multiplicity of legs, wherein said legs are of a height which is greater than the height of said rib wall.

2. The combination griddle and hot plate according to claim 1 including a second rib wall projecting outwardly from said plate member hot plate surface at the peripheral boundary thereof to define a barrier to retard the escape of hot convective gases at said boundary and thereby aid in maintaining a substantially uniform temperature heating of said griddle surface when the plate member is heated by hot gases from the stove in said first attitude.

3. The combination griddle and hot plate according to claim 2 including a third rib wall of annular configuration and projecting outwardly from said plate member hot plate surface and geometrically centered therewith, said annular rib wall being of an external diameter and height disposed for insertion into a central opening provided on a stove burner to centrally align said plate member therewith.

4. The combination griddle and hot plate according to claim 3 wherein said third rib wall is greater in height than said first and second rib walls and lesser in height than said leg members, whereby said third rib wall projects beyond said first and second rib walls to extend into said stove burner opening for engagement with stove burner parts defining said opening to limit lateral shifting of the plate member with respect to the stove burner when in said first attitude, and whereby said leg members project beyond said first, second and third rib walls to support upon the free ends of said leg members the vessel to be heated when said plate member is in said second attitude, thereby minimizing the transmission of heat to such vessel by conduction.

5. The combination griddle and hot plate according to claim 4 wherein said plate member is circular and has a diameter approximately equal to the horizontal dimension of the stove burner used for heating it.

6. The combination griddle and hot plate according to claim 5 wherein said first rib member is annular and geometrically centered with the plate member, and has a diameter approximately one-half that of the plate member.

7. The combination griddle and hot plate according to claim 6 including at least three leg members of substantialy equal height.

8. The combination griddle and hot plate according to claim 7 wherein said leg members are arranged in a laterally spaced-apart relation to one another wherein said leg members are disposed for free extension into open portions of the stove burner used for heating said plate member in said first attitude, whereby in said first attitude the plate member rests upon the stove burner supported by at least one of said first and second rib walls in contact with the stove burner.

References Cited

UNITED STATES PATENTS

| | | | |
|---|---|---|---|
| 394,706 | 12/1888 | Martel | 126—215 |
| 864,518 | 8/1907 | Cruickshank | 126—215 |
| 923,690 | 6/1909 | Newsam | 126—220 |
| 1,219,014 | 3/1917 | Lindemann | 126—215 |
| 1,733,450 | 10/1929 | Detwiler | 99—340 |
| 1,757,315 | 5/1930 | Kercher et al. | 126—214 |
| 1,948,124 | 2/1934 | Morgan | 126—215 X |

FOREIGN PATENTS

| | | |
|---|---|---|
| 13,100 | 5/1928 | Australia. |
| 803,318 | 6/1936 | France. |

WALTER A. SCHEEL, *Primary Examiner.*

J. M. NEARY, *Assistant Examiner.*